(12) United States Patent
Croak et al.

(10) Patent No.: US 7,555,113 B1
(45) Date of Patent: Jun. 30, 2009

(54) METHOD AND APPARATUS FOR PROVIDING CUSTOMER PREMISE EQUIPMENT BASED ROUTING

(75) Inventors: Marian Croak, Fair Haven, NJ (US); Hossein Eslambolchi, Los Altos Hills, CA (US)

(73) Assignee: AT&T Corp., New York, NY (US)

( * ) Notice: Subject to any disclaimer, the term of this patent is extended or adjusted under 35 U.S.C. 154(b) by 537 days.

(21) Appl. No.: 11/262,638

(22) Filed: Oct. 31, 2005

(51) Int. Cl.
*H04M 7/00* (2006.01)
(52) U.S. Cl. .............................. 379/221.01; 379/114.02; 370/352
(58) Field of Classification Search .................. 370/352, 370/328, 503; 455/509
See application file for complete search history.

(56) References Cited

U.S. PATENT DOCUMENTS

| | | | | |
|---|---|---|---|---|
| 5,915,008 A | * | 6/1999 | Dulman | 379/221.08 |
| 6,907,031 B1 | * | 6/2005 | Ehlinger et al. | 370/352 |
| 2003/0152210 A1 | * | 8/2003 | Delaney et al. | 379/220.01 |
| 2004/0218748 A1 | * | 11/2004 | Fisher | 379/221.01 |
| 2008/0165765 A1 | * | 7/2008 | Neuhaus | 370/352 |

* cited by examiner

*Primary Examiner*—Creighton Smith

(57) ABSTRACT

A method and apparatus for enabling a network provider to download routing profiles into an intelligent Customer Premise Equipment (CPE) device to enable the CPE to determine the best provider to route a particular call to are disclosed. The CPE determines the best provider based on criteria specified by the subscriber and the network provider and then sends the call to a specific IP address, that has been previously been downloaded and configured in the CPE, to reach a selected network provider.

20 Claims, 4 Drawing Sheets

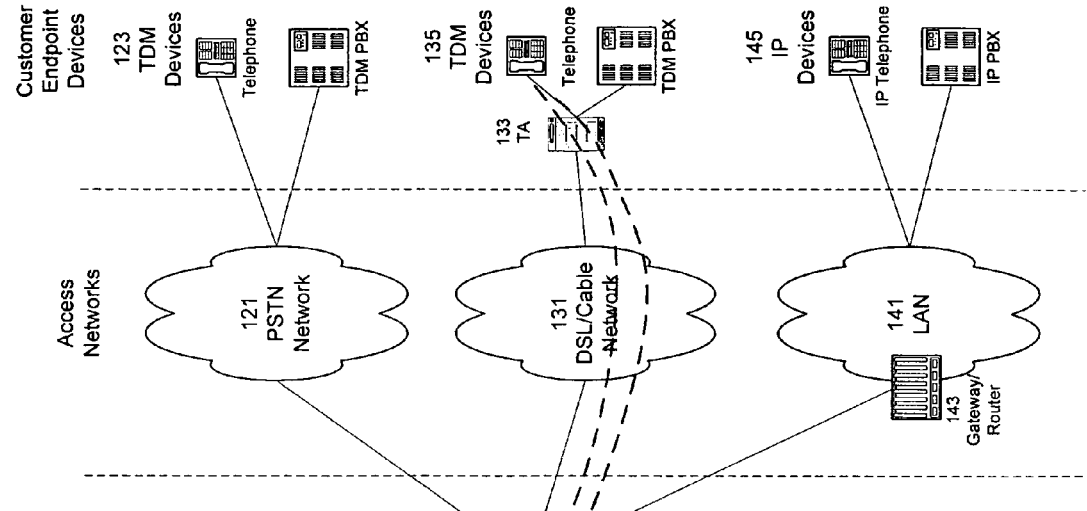
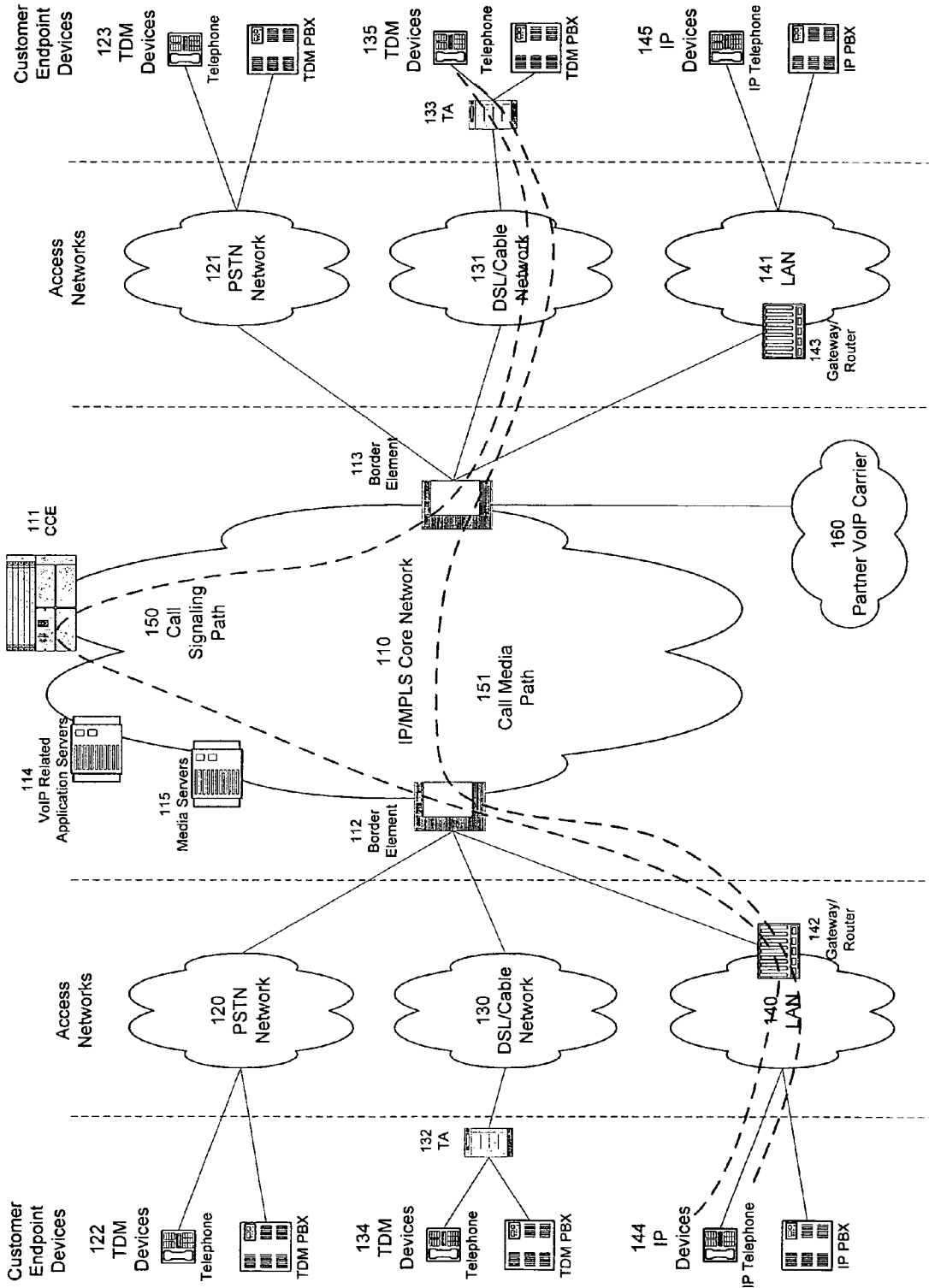
FIG. 1

METHOD AND APPARATUS FOR PROVIDING CUSTOMER PREMISE EQUIPMENT BASED ROUTING

The present invention relates generally to communication networks and, more particularly, to a method and apparatus for providing customer premise equipment (CPE) based routing in communication networks, e.g., packet networks such as Voice over Internet Protocol (VoIP) networks.

BACKGROUND OF THE INVENTION

Consumers and business customers always desire to subscribe to telecommunication services that provide the least cost at the highest quality. The best provider to meet these selection factors may differ as a function of the called destination, time of day, and day of week. A subscriber should be able to route a call to a different network that provide the least cost and the highest quality depending on the called destination, time of day, and day of week.

Therefore, a need exists for a method and apparatus for providing customer premise equipment (CPE) based routing in a packet network, e.g., a VoIP network.

SUMMARY OF THE INVENTION

In one embodiment, the present invention enables a network provider to download routing profiles into an intelligent Customer Premise Equipment (CPE) device to enable the CPE to determine the best provider to route a particular call to. The CPE determines the best provider based on criteria specified by the subscriber and the network provider and then sends the call to a specific IP address, that has been previously been downloaded and configured in the CPE, to reach a selected network provider.

BRIEF DESCRIPTION OF THE DRAWINGS

The teaching of the present invention can be readily understood by considering the following detailed description in conjunction with the accompanying drawings, in which:

FIG. 1 illustrates an exemplary Voice over Internet Protocol (VoIP) network related to the present invention;

To facilitate understanding, identical reference numerals have been used, where possible, to designate identical elements that are common to the figures.

DETAILED DESCRIPTION

Figure 2:
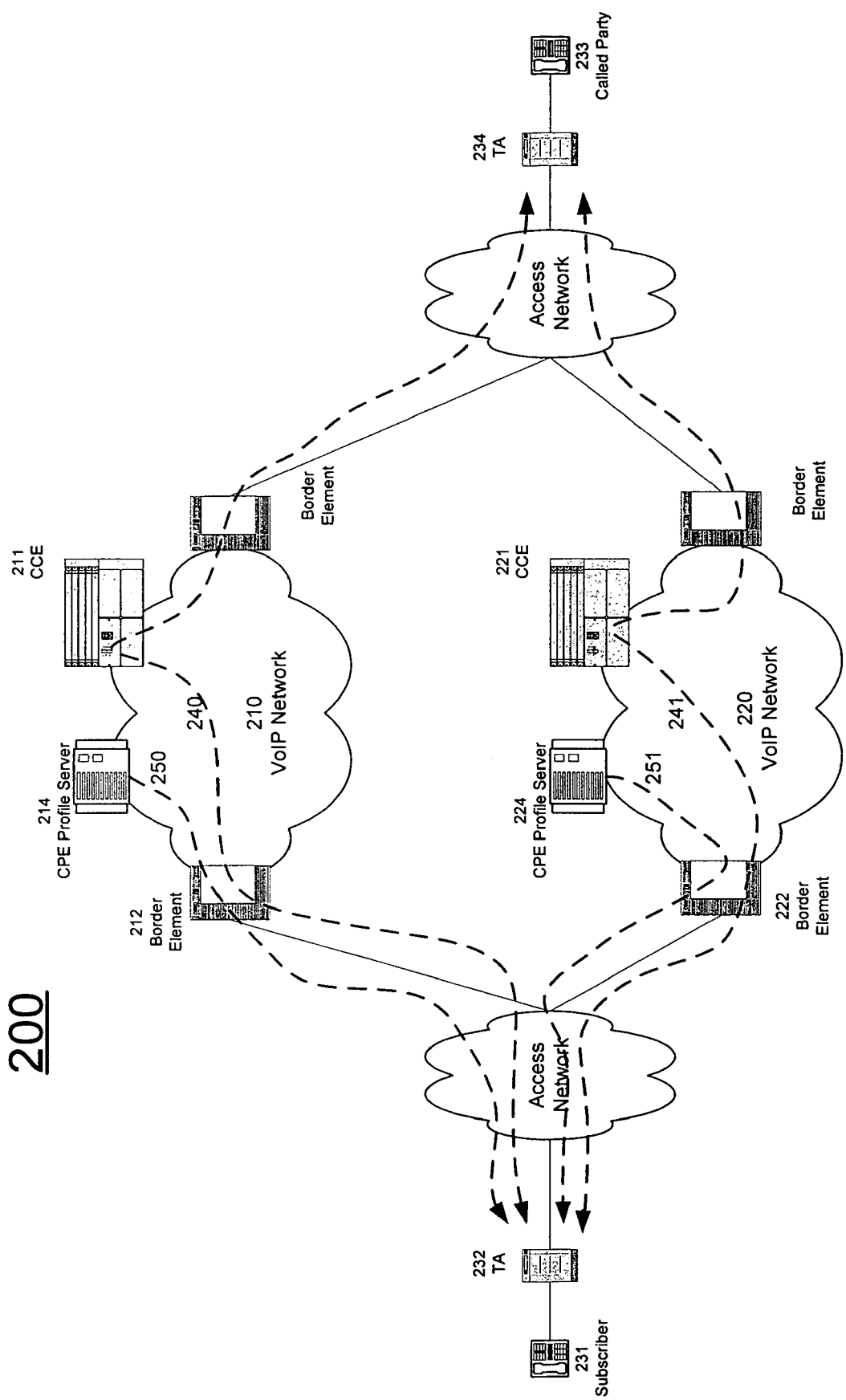
FIG. 2 illustrates an example of providing customer premise equipment (CPE) based routing in a VoIP network of the present invention.

To better understand the present invention, FIG. 1 illustrates a communication architecture 100 having an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a SIP back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, teleconference bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Consumers and business customers always desire to subscribe to telecommunication services that provide the least cost at the highest quality. The best provider to meet these selection factors may differ as a function of the called destination, time of day, and day of week. A subscriber should be able to route a call to a different network that provide the least cost and the highest quality depending on the called destination, time of day, and day of week.

To address this need, the present invention enables a network provider to download routing profiles into an intelligent Customer Premise Equipment (CPE) device to enable the CPE to determine the best provider to route a particular call to. The CPE determines the best provider based on criteria specified by the subscriber and the network provider and then sends the call to a specific IP address, that has been previously been downloaded and configured in the CPE, to reach a selected network provider.

FIG. 2 illustrates an example 200 of providing customer premise equipment (CPE) based routing in a packet network, e.g., a VoIP network of the present invention. In FIG. 2, subscriber 231 uses TA 232 to access VoIP services supported by VoIP network 210 and VoIP network 220. TA 232 has been configured with a CPE routing profile that specifies the routing rules to use based on called party destination, time of day, and day of week. TA 232 has downloaded CPE routing profiles from CPE profile server 214 and/or CPE profile server 224 that can be used to specify a compiled CPE routing profile based on called party destination, time of day, and day of week using flow 250 and flow 251 respectively. For instance, TA 232 can compile all downloaded calling rate structure information and determine the particular service provider to use on a time of day and day of week basis.

For instance, called party 233 is located in a foreign country and VoIP network 210 and VoIP network 220 provides the same voice quality. In addition, VoIP network 210 provides a lower calling rate than VoIP network 220 during week days and vice versa during the weekends, the CPE routing profile can be configured to specify using VoIP network 210 to complete a call to called party 233 via TA 234 during the weekdays and use VoIP network 220 to complete a call to called party 233 via TA 234 during the weekends.

Specifically, when the CPE routing profile in TA 232 indicates that a call from TA 232 to TA 234 is to be completed using VoIP network 210 during the weekdays, TA 232 sends the call setup message to BE 212 using the IP address of BE 212 downloaded and stored in the CPE routing profile to reach VoIP network 210. The call setup message is then forwarded by BE 212 to CCE 211 and then TA 234 using flow 240.

When the CPE routing profile in TA 232 indicates that a call from TA 232 to TA 234 is to be completed using VoIP network 220 during the weekends, TA 232 sends the call setup message to BE 222 using the IP address of BE 222 downloaded and stored in the CPE routing profile to reach VoIP network 220. The call setup message is then forwarded by BE 222 to CCE 221 and then TA 234 using flow 241.

Figure 3:
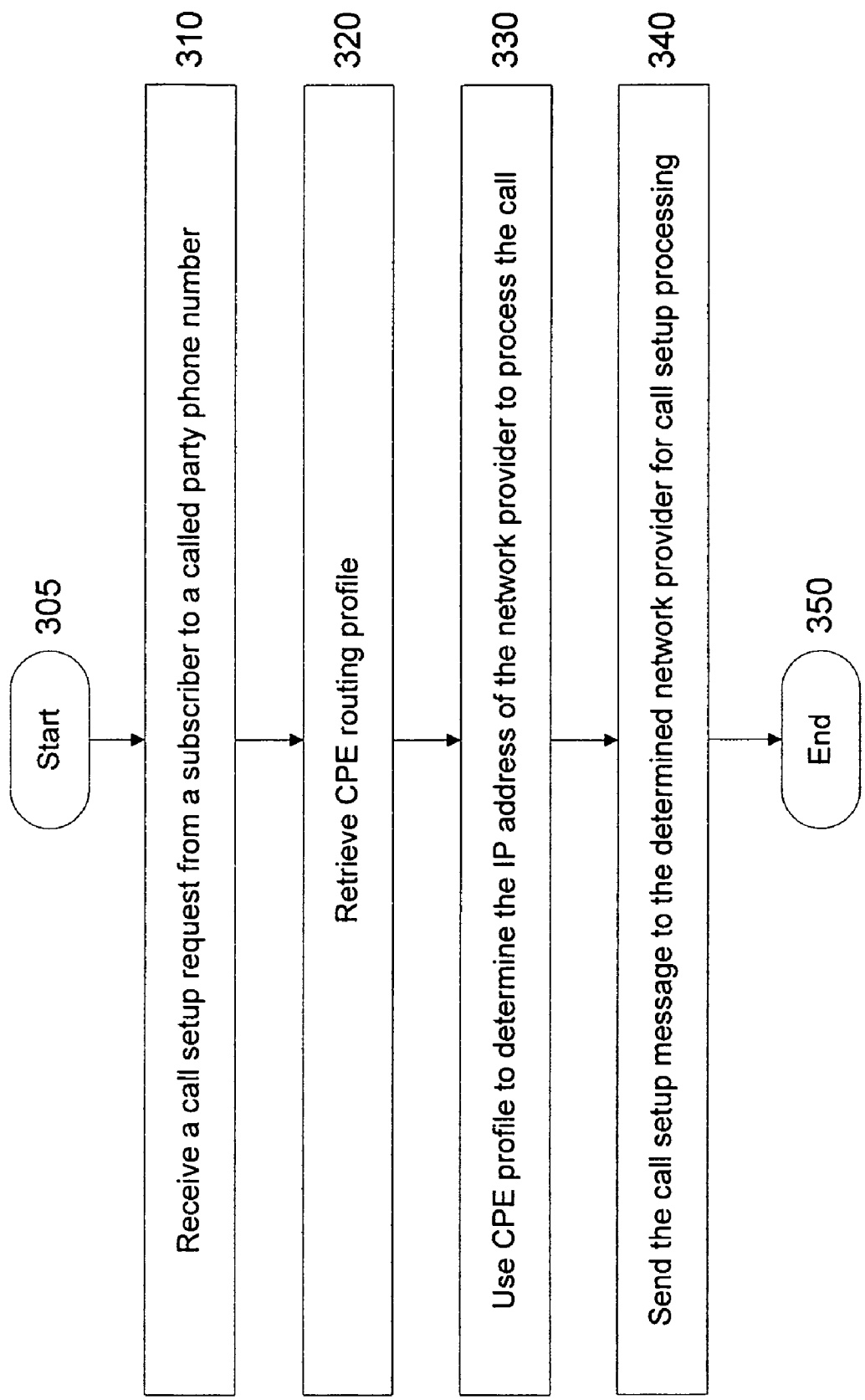
FIG. 3 illustrates a flowchart of a method for providing customer premise equipment (CPE) based routing in a packet network, e.g., a VoIP network, of the present invention.

FIG. 3 illustrates a flowchart of a method 300 for providing customer premise equipment (CPE) based routing in a packet network, e.g., a VoIP network, of the present invention. Method 300 starts in step 305 and proceeds to step 310.

In step 310, the method receives a call setup request from a subscriber destined to a called party phone number. The call setup request is initiated by the subscriber by dialing a phone number of the called party. The dialed digits are received by a TA used by the subscriber.

In step 320, the method retrieves the CPE routing profile. The CPE routing profile is downloaded from one or more CPE profile servers maintained by various VoIP network providers and stored in the TA. The downloaded CPE routing profiles can be used to specify a compiled CPE routing profile based on called party destination, time of day, and day of week. For instance, the TA can compile all downloaded calling rate structure information and determine the particular service provider to use on a time of day and day of week basis. The compiled CPE routing profile is retrieved from non-volatile memory residing in the TA. It should be noted that the routing profile has been downloaded prior to receiving said call setup message.

In step 330, the method uses the retrieved CPE routing profile to determine the VoIP network to use to complete the call based on the called party destination, time of day, and day of week information configured in the retrieved compiled CPE routing profile. A VoIP network can be selected using the downloaded IP address of a BE through which the selected VoIP network services can be accessed.

In step 340, the method sends a call setup message to the selected VoIP network using the retrieved IP address for call processing. The call setup message is created and sent by the TA. The method ends in step 350.

Figure 4:
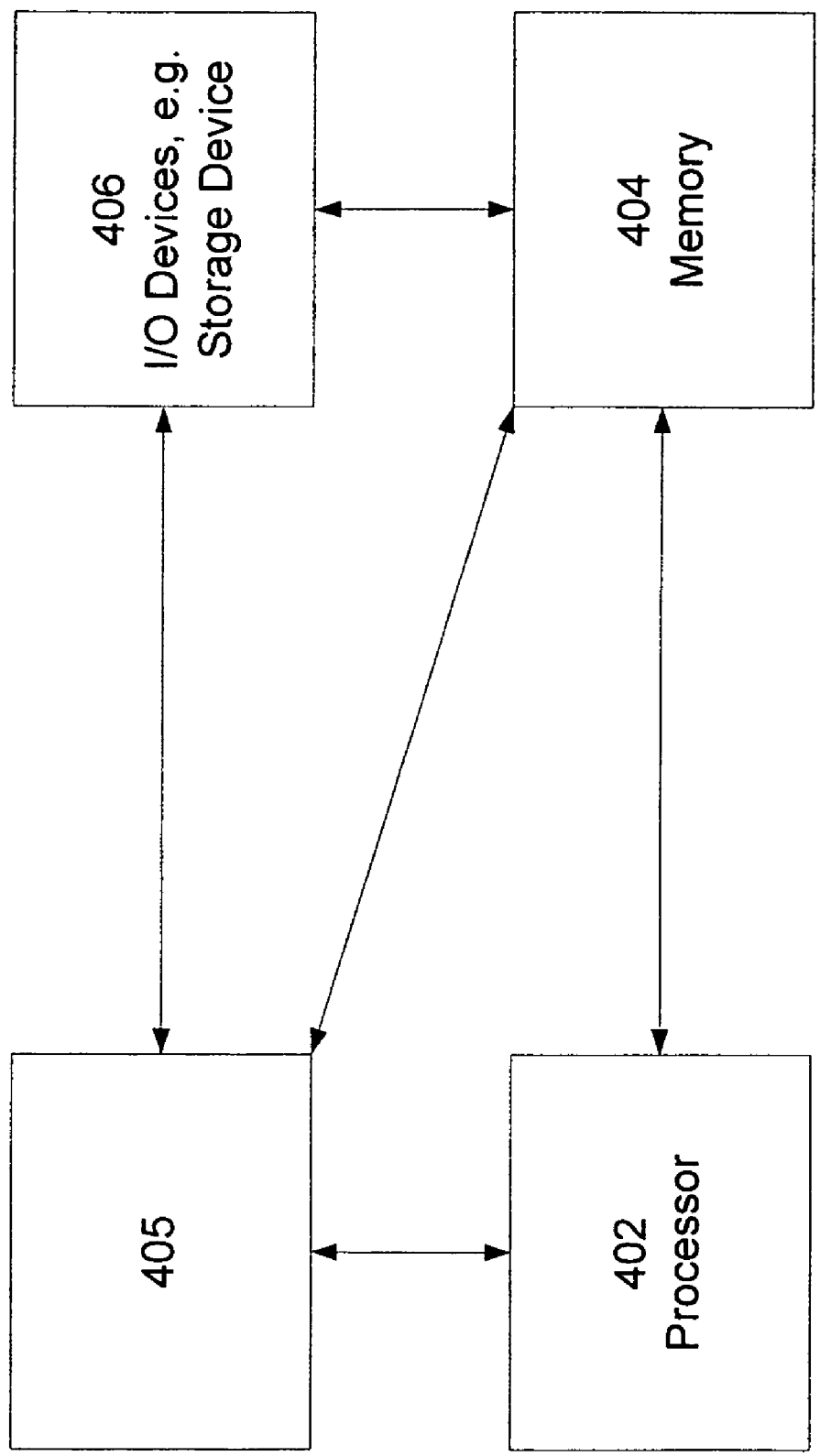
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing CPE based routing, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for providing CPE based routing can be loaded into memory 404 and executed by processor 402 to implement the functions as discussed above. As such, the present process 405 for providing CPE based routing (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing customer premise equipment (CPE) based routing in a communication network, comprising:
   downloading a plurality of CPE routing profiles from a plurality of corresponding service providers to a customer premise equipment (CPE); and
   sending a call setup message to one of said plurality of service providers selected by said customer premise equipment (CPE), where said CPE selects said selected service provider in accordance with information comprised in said plurality of CPE routing profiles.

2. The method of claim 1, wherein said communication network is a Voice over Internet Protocol (VoIP) network or a Service over Internet Protocol (SoIP) network.

3. The method of claim 1, wherein said CPE is a Terminal Adaptor (TA).

4. The method of claim 1, wherein each of said plurality of CPE routing profiles comprises at least one of: a per minute calling rate based on a time of day, a per minute calling rate based on a day of week or an Internet Protocol (IP) address to be used to reach one of said plurality of service providers.

5. The method of claim 1, wherein said plurality of CPE routing profiles is compiled into a single CPE routing profile for assessing which one of said plurality of service providers to select for completing said call setup message based on a time of day basis or a day of week basis.

6. The method of claim 5, wherein said sending comprises:
   retrieving said single compiled CPE routing profile to determine said selected service provider; and
   sending said call setup message to said selected service provider using a corresponding Internet Protocol (IP) address of said selected service provider to complete said call setup message.

7. The method of claim 1, wherein said information comprises calling rate structure information associated with a cost for processing a call in accordance with a time of day basis or a day of week basis.

8. A computer-readable medium having stored thereon a plurality of instructions, the plurality of instructions including instructions which, when executed by a processor, cause the processor to perform the steps of a method for providing customer premise equipment (CPE) based routing in a communication network, comprising:
   downloading a plurality of CPE routing profiles from a plurality of corresponding service providers to a customer premise equipment (CPE); and
   sending a call setup message to one of said plurality of service providers selected by said customer premise equipment (CPE), where said CPE selects said selected service provider in accordance with information comprised in said plurality of CPE routing profiles.

9. The computer-readable medium of claim 8, wherein said communication network is a Voice over Internet Protocol (VoIP) network or a Service over Internet Protocol (SoIP) network.

10. The computer-readable medium of claim 8, wherein said CPE is a Terminal Adaptor (TA).

11. The computer-readable medium of claim 8, wherein each of said plurality of CPE routing profiles comprises at least one of: a per minute calling rate based on a time of day, a per minute calling rate based on a day of week or an Internet Protocol (IP) address to be used to reach one of said plurality of service providers.

12. The computer-readable medium of claim 8, wherein said plurality of CPE routing profiles is compiled into a single CPE routing profile for assessing which one of said plurality of service providers to select for completing said call setup message based on a time of day basis or a day of week basis.

13. The computer-readable medium of claim 12, wherein said sending comprises:
   retrieving said single compiled CPE routing profile to determine said selected service provider; and
   sending said call setup message to said selected service provider using a corresponding Internet Protocol (IP) address of said selected service provider to complete said call setup message.

14. The computer-readable medium of claim 8, wherein said information comprises calling rate structure information associated with a cost for processing a call in accordance with a time of day basis or a day of week basis.

15. An apparatus for providing customer premise equipment (CPE) based routing in a communication network, comprising:
   means for downloading a plurality of CPE routing profiles from a plurality of corresponding service providers to a customer premise equipment (CPE); and
   means for sending a call setup message to one of said plurality of service providers selected by said customer premise equipment (CPE), where said CPE selects said selected service provider in accordance with information comprised in said plurality of CPE routing profiles.

16. The apparatus of claim 15, wherein said communication network is a Voice over Internet Protocol (VoIP) network or a Service over Internet Protocol (SoIP) network.

17. The apparatus of claim 15, wherein said CPE is a Terminal Adaptor (TA).

18. The apparatus of claim 15, wherein each of said plurality of CPE routing profiles comprises at least one of: a per minute calling rate based on a time of day, a per minute calling rate based on a day of week or an Internet Protocol (IP) address to be used to reach one of said plurality of service providers.

19. The apparatus of claim 15, wherein said plurality of CPE routing profiles is compiled into a single CPE routing profile for assessing which one of said plurality of service providers to select for completing said call setup message based on a time of day basis or a day of week basis.

20. The apparatus of claim 19, wherein said sending means comprises:
  means for retrieving said single compiled CPE routing profile to determine said selected service provider; and
  means for sending said call setup message to said selected service provider using a corresponding Internet Protocol (IP) address of said selected service provider to complete said call setup message.

* * * * *